(12) United States Patent
Zhang et al.

(10) Patent No.: US 10,064,143 B2
(45) Date of Patent: Aug. 28, 2018

(54) SYSTEM AND METHOD FOR SIGNAL BACKUP OF ACTIVE DAS MASTER UNIT

(71) Applicant: Comba Telecom Technology (Guangzhou) Co., Ltd., Guangzhou (CN)

(72) Inventors: Hui Zhang, Guangzhou (CN); Song Cao, Guangzhou (CN); Hailong Deng, Guangzhou (CN); Yuwen Zhang, Guangzhou (CN)

(73) Assignee: COMBA TELECOM TECHNOLOGY (GUANGZHOU) CO., LTD., Guangzhou (CN)

( * ) Notice: Subject to any disclaimer, the term of this patent is extended or adjusted under 35 U.S.C. 154(b) by 0 days.

(21) Appl. No.: 15/306,994

(22) PCT Filed: May 8, 2015

(86) PCT No.: PCT/CN2015/078577
§ 371 (c)(1),
(2) Date: Oct. 26, 2016

(87) PCT Pub. No.: WO2016/179751
PCT Pub. Date: Nov. 17, 2016

(65) Prior Publication Data
US 2018/0124714 A1    May 3, 2018

(51) Int. Cl.
*H04B 1/26*   (2006.01)
*H04W 52/34*  (2009.01)
(Continued)

(52) U.S. Cl.
CPC .............. *H04W 52/343* (2013.01); *G01S 1/08* (2013.01); *G01S 5/0226* (2013.01); *H04B 10/29* (2013.01);
(Continued)

(58) Field of Classification Search
CPC ......... G01S 1/08; G01S 5/0226; H04B 10/29; H04W 24/04; H04W 36/30; H04W 52/343; H04W 52/386; H04W 88/06
(Continued)

(56) References Cited

U.S. PATENT DOCUMENTS 7,590,354 B2 * 9/2009 Sauer .................. H01Q 9/285
                                                      398/115
8,023,439 B2 * 9/2011 Rao .................... H04L 67/1002
                                                      370/219
(Continued)

FOREIGN PATENT DOCUMENTS

| CN | 102394698 A | 3/2012 |
| CN | 102740350 A | 10/2012 |
| CN | 103581973 A | 2/2014 |

OTHER PUBLICATIONS

International Search Report and Written Opinion for Application No. PCT/CN2015/078577 dated Feb. 16, 2016.

*Primary Examiner* — Tan H Trinh
(74) *Attorney, Agent, or Firm* — Kilpatrick Townsend & Stockton, LLP

(57) ABSTRACT

A system and method for signal backup of active DAS master unit are disclosed. The system includes a state detection unit, a backup processing unit and at least two power distribution units, wherein a backup signal output port and a plurality of backup access ports with a number great than or equal to that of the power distribution units are arranged on the backup processing unit, and a backup signal input port and a plurality of radio frequency access ports with a number great than or equal to that of the power distribution units are arranged on the state detection unit; and each power distribution unit has an input port coupled to one of a plurality of signal sources, and two output ports in which one is coupled to one radio frequency access port (Continued)

and the other is coupled to one backup access port, and the backup signal output port is coupled to the backup signal input port. The backup processing unit is configured to control a signal from the signal source coupled to the radio frequency access port which is in an accessing-abnormal state to access the backup signal input port, when any one of the plurality of radio frequency access ports is in the accessing-abnormal state. It can reduce the hardware cost while guarantee the reliability to improve the cost performance of the backup system.

10 Claims, 6 Drawing Sheets

(51) Int. Cl.
| | |
|---|---|
| G01S 1/08 | (2006.01) |
| G01S 5/02 | (2010.01) |
| H04W 52/38 | (2009.01) |
| H04W 24/04 | (2009.01) |
| H04W 36/30 | (2009.01) |
| H04W 88/06 | (2009.01) |
| H04B 10/29 | (2013.01) |

(52) U.S. Cl.
CPC .......... *H04W 24/04* (2013.01); *H04W 36/30* (2013.01); *H04W 52/386* (2013.01); *H04W 88/06* (2013.01)

(58) Field of Classification Search
USPC .......... 455/69, 522, 562.1, 436, 524, 412.1, 455/13.3, 67.11, 67.16, 575.7, 193.1, 455/197.1, 198.1, 275, 276.1; 381/58; 398/5, 115, 116; 370/310, 312, 389, 219, 370/221
See application file for complete search history.

(56) References Cited

U.S. PATENT DOCUMENTS

| | | | | |
|---|---|---|---|---|
| 9,690,791 | B1* | 6/2017 | Chopra | G06F 17/30088 |
| 9,740,700 | B1* | 8/2017 | Chopra | G06F 17/30088 |
| 2007/0099667 | A1* | 5/2007 | Graham | H01Q 1/007 455/562.1 |
| 2007/0264009 | A1* | 11/2007 | Sabat, Jr. | H04B 10/1127 398/5 |
| 2009/0201801 | A1* | 8/2009 | Ono | H04B 7/2606 370/221 |
| 2010/0190519 | A1* | 7/2010 | Zavadsky | H04W 52/343 455/522 |
| 2013/0251163 | A1* | 9/2013 | Adamson | H04R 3/12 381/58 |
| 2017/0078922 | A1* | 3/2017 | Raleigh | H04W 28/10 |
| 2017/0289826 | A1* | 10/2017 | Riggsby | H04L 5/08 |
| 2018/0027431 | A1* | 1/2018 | Cho | H04W 24/04 |

\* cited by examiner

SYSTEM AND METHOD FOR SIGNAL BACKUP OF ACTIVE DAS MASTER UNIT

FIELD

The present disclosure relates generally to the field of mobile communication, and more particularly, to a system and method for signal backup of active DAS master unit.

BACKGROUND

With the rapid development of network construction and customer application requirements of mobile communication, requirements for the coverage and quality of indoor signals are increasingly growing stronger. The active indoor Distributed Antenna System (DAS) has gradually become a preferable scheme for achieving high quality indoor in-depth coverage. Customers' demands on system reliability, especially concerns about the reliability of active components, are rising as the DAS being used more and more widely. An accessing scheme of 1+1 backup is adopted in some large, importance projects to improve product reliability. However, the 1+1 backup requires more hardware resources while increasing the system redundancy, resulting in an increase of product cost.

SUMMARY

In view of the above technical problems in the prior art, it is an objective of the present disclosure to provide a system for signal backup of active DAS master unit, which can reduce the hardware cost while guarantee the reliability to improve the cost performance of the backup system.

The objective of the present disclosure is achieved by the following technical solutions.

A system for signal backup of active DAS master unit includes a state detection unit, a backup processing unit and at least two power distribution units, wherein a backup signal output port and a plurality of backup access ports with a number great than or equal to that of the power distribution units are arranged on the backup processing unit, and a backup signal input port and a plurality of radio frequency (RF) access ports with a number great than or equal to that of the power distribution units are arranged on the state detection unit;

each of the at least two power distribution units has an input port coupled to one of a plurality of signal sources, and two output ports of which one is coupled to one of the plurality of radio frequency access ports and the other is coupled to one of the plurality of backup access ports, and the backup signal output port is coupled to the backup signal input port;

each of the power distribution units is configured to divide a signal from the coupled signal source into a first signal accessing the coupled radio frequency access port and a second signal accessing the coupled backup access port;

the state detection unit is configured to detect an accessing state of each of the plurality of radio frequency access ports; and the backup processing unit is configured to control each second signal to be in a backup-off state, when each of the plurality of radio frequency access ports is in an accessing-normal state, and control the second signal from the signal source coupled to the radio frequency access port in an accessing-abnormal state to access the backup signal input port, when any one of the plurality of radio frequency access ports is in the accessing-abnormal state.

The system for signal backup of active DAS master unit according to the present disclosure includes a state detection unit, a backup processing unit and at least two power distribution units, wherein a backup signal output port and a plurality of backup access ports with a number great than or equal to that of the power distribution units are arranged on the backup processing unit, a backup signal input port and a plurality of radio frequency access ports with a number great than or equal to that of the power distribution units are arranged on the state detection unit, each of the at least two power distribution units has an input port coupled to one of a plurality of signal sources, and two output ports in which one is coupled to one of the plurality of radio frequency access ports and the other is coupled to one of the plurality of backup access ports, and the backup signal output port is coupled to the backup signal input port. That is, a signal from each signal source can be divided into two, one may access one radio frequency access port of the state detection unit directly, and the other may access the backup signal input port of the state detection unit through the backup processing unit. In this way, when the signal of the radio frequency access port is abnormal in accessing, a corresponding channel to access the backup signal input port through the backup processing unit may be enabled. A same backup processing unit can be applied for a plurality of signal sources for making backups, to achieve a N+1 backup, so the present invention can reduce the hardware cost while guarantee the reliability to improve the cost performance of the backup system.

It is another objective of the present disclosure to provide a method for signal backup of active DAS master unit, which can reduce the hardware cost while guarantee the reliability.

According to another aspect of the present disclosure, a method for signal backup of active DAS master unit is provided, including:

dividing a respective signal from each of a plurality of signal sources into a first signal and a second signal, the respective first signal accessing one of a plurality of radio frequency access ports of a master unit;

detecting an accessing state of each of the plurality of radio frequency access ports; and controlling each second signal to be in a backup-off state, when each of the plurality of radio frequency access ports is detected to be in an accessing-normal state, and controlling the second signal from the signal source coupled to the radio frequency access port which is in an accessing-abnormal state to access a backup signal input port of the master unit, when any one of the plurality of radio frequency access ports is in the accessing-abnormal state.

The method for signal backup of active DAS master unit according to the present disclosure may include: dividing a respective signal from each of a plurality of signal sources into a first signal and a second signal, the respective first signal accessing one of a plurality of radio frequency access ports of a master unit; detecting an accessing state of each of the plurality of radio frequency access ports; and controlling each second signal to be in a backup-off state, when each of the plurality of radio frequency access ports is detected to be in an accessing-normal state, and controlling the second signal from the signal source coupled to the radio frequency access port which is in an accessing-abnormal state to access a backup signal input port of the master unit, when any one of the plurality of radio frequency access ports is in the accessing-abnormal state. That is, a signal from each signal source can be divided into two, one may access one radio frequency access port of the state detection unit directly, and the other may access the backup signal input port of the state detection unit through the backup processing unit. In this way, even any one of the plurality of signal sources is abnormal in accessing, it can be backed up by accessing the backup signal input port, to achieve a N+1 backup, so the present invention can reduce the hardware cost while guarantee the reliability to improve the cost performance of the backup system.

DETAILED DESCRIPTION OF THE PREFERRED EMBODIMENTS

Purposes, technical solutions, and advantages according to the present disclosure may be understood by reference to the following description of the preferred embodiments taken in conjunction with the accompanying drawings. It is to be understood that the specific implements described herein tend to explain the present disclosure not to limit the scope of the present disclosure.

Figure 1:
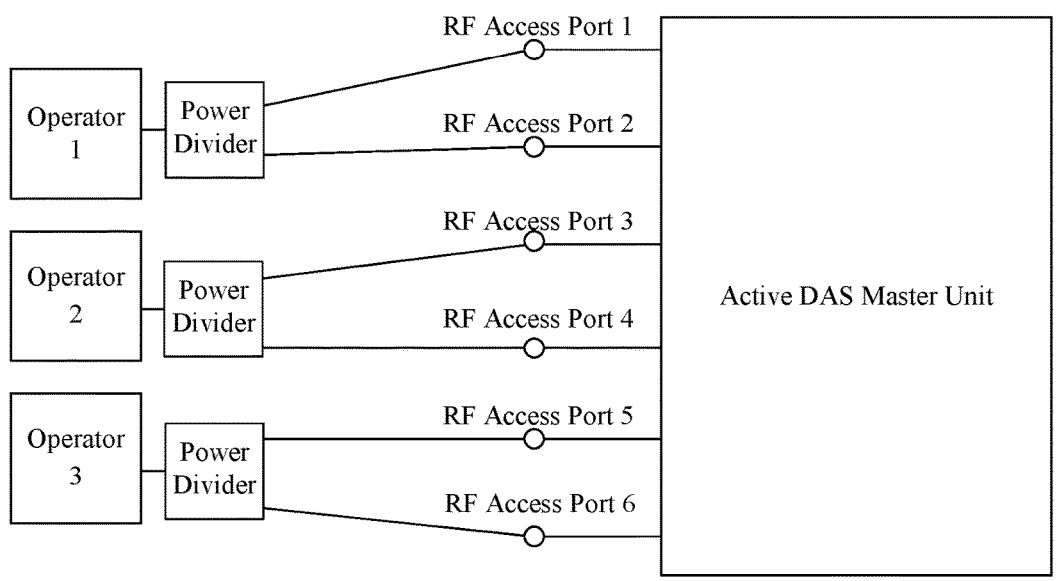
FIG. 1 is a schematic diagram illustrating a traditional system for signal backup of active DAS master unit.
Figure 2:
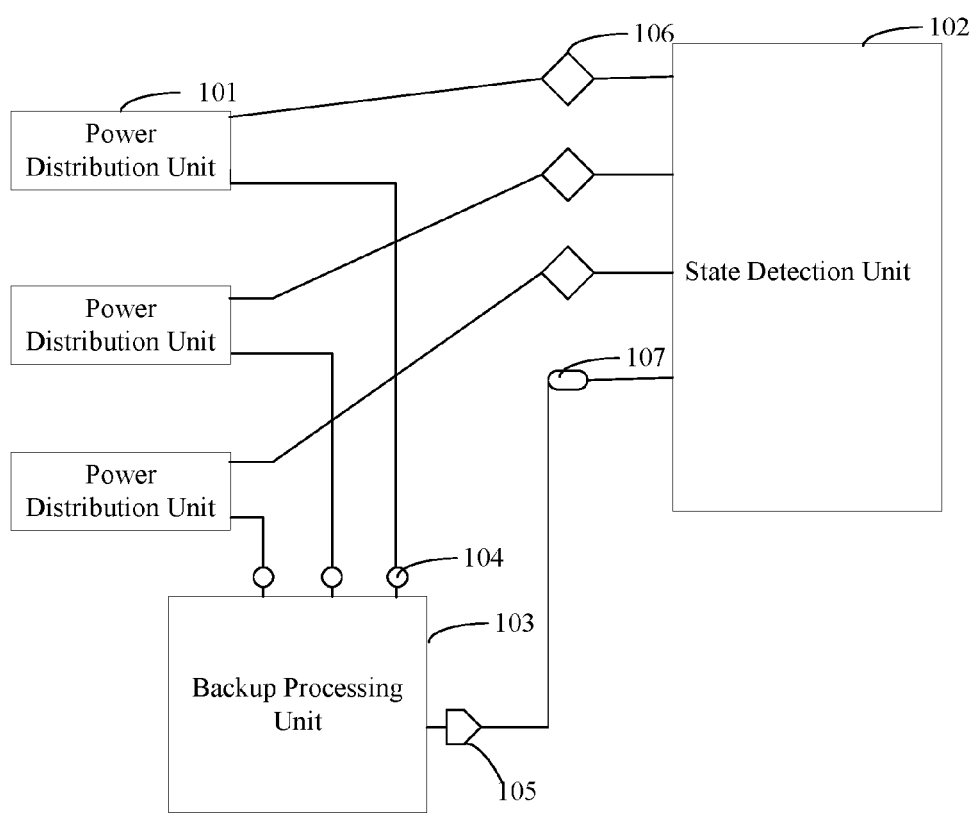
FIG. 2 is a schematic diagram illustrating a system for signal backup of active DAS master unit according to one embodiment of the present disclosure.

See FIG. 2, which is a schematic diagram illustrating a system for signal backup of active DAS master unit according to one embodiment of the present disclosure.

As shown in FIG. 2, a system for signal backup of active DAS master unit of the embodiment includes a state detection unit 102, a backup processing unit 103 and at least two power distribution units 101. A backup signal output port 105 and a plurality of backup access ports 104 with a number great than or equal to that of the power distribution units 101 are arranged on the backup processing unit 103. A backup signal input port 107 and a plurality of radio frequency (RF) access ports 106 with a number great than or equal to that of the power distribution units 101 are arranged on the state detection unit 102.

Each of the at least two power distribution units 101 has an input port coupled to a signal source (not shown), and two output ports in which one is coupled to one of the plurality of radio frequency access ports 106 and the other is coupled to one of the plurality of backup access ports 104, and the backup signal output port 105 is coupled to the backup signal input port 107.

Each of the power distribution units 101 is configured to divide a signal from the coupled signal source into a first signal accessing the coupled radio frequency access port 106 and a second signal accessing the coupled backup access port 104.

The state detection unit 102 is configured to detect an accessing state of each of the plurality of radio frequency access ports 106.

The backup processing unit 103 is configured to control each second signal to be in a backup-off state, when each of the plurality of radio frequency access ports 106 is in an accessing-normal state, and control the second signal from the signal source coupled to the radio frequency access port 106 which is in an accessing-abnormal state to access the backup signal input port 107, when any one of the plurality of radio frequency access ports 106 is in the accessing-abnormal state.

It should be noted that although FIG. 2 shows a configuration including three power distribution units 101, there may be any other appropriate number of power distribution units 101, such as two, four or five, which can be determined by the number of signal sources actually required to access. When the number of the power distribution units 101 is changed, both of the numbers of the backup access ports 104 and the radio frequency access ports 106 are adaptively changed. In addition, in the configuration as shown in FIG. 2, the number of the power distribution units 101 is the same as the number of the backup access ports 104 and the number of the radio frequency access ports 106 respectively, but the numbers of the three may be different, and for example, the number of the backup access ports 104 and the number of the radio frequency access ports 106 may be larger than that of the power distribution units 101 respectively, such that the system may be extendable for more signal sources to access.

The system for signal backup of active DAS master unit according to the present disclosure will be further described in details.

In a particular embodiment, each of signals from different signal sources, such as communication signals from different operators, may be distributed with power through a power distribution unit 101 respectively, to obtain two signals. The two signals may be configured to have same or different energy according to practical requirements. Each signal of each signal source may be divided into two signals, including a first signal and a second signal. The respective first signal may access one of the radio frequency access ports 106, with different signal sources corresponding to different radio frequency access ports 106 respectively. The respective second signal may access one of the backup access ports 104 of the backup processing unit 103, with different signal sources corresponding to different backup access ports 104 respectively. The backup signal output port 105 arranged on the backup processing unit 103 is coupled to the backup signal input port 107 arranged on the state detection unit 102.

Specifically, the above power distribution unit 101 may be a power divider.

The state detection unit 102 may detect the accessing state of each of the radio frequency access ports 106 in real time. When each of the radio frequency access ports 106 is in the accessing-normal state, the backup processing unit 103 may control the second signal to be in the backup-off state after acquiring this information, and at this time, there is no signal output from the backup signal output port 105 of the backup processing unit 103. When any one of the radio frequency access ports 106 is in the accessing-abnormal state, the backup processing unit 103 may acquire this information, identify the signal of which signal source is not able to access the radio frequency access port 106 in normal based on the acquired information, and control the second signal from the signal source coupled to the identified radio frequency access port 106 (i.e., the radio frequency access port 106 which is in the accessing-abnormal state at present) to access the backup signal input port 107, that is, the second signal from the signal source coupled to the identified radio frequency access port 106 is switched from the backup-off state to the backup-on state. At this time, the signal output from the backup signal output port 105 of the backup processing unit 103 is the second signal from the signal source coupled to the identified radio frequency access port 106, such that the master unit can continue to work.

The frequency access port 106 in the accessing-abnormal state also means there is an abnormality in the path to the radio frequency access port 106. Such abnormality may be hardware failure or software failure.

As mentioned, the backup processing unit 103 should acquire information about whether each of the radio frequency access ports 106 is normal for accessing from the state detection unit 102, so communication should be created between the backup processing unit 103 and the state detection unit 102. In one embodiment, the backup processing unit 103 may be coupled with the state detection unit 102 via a data line, and the backup processing unit 103 may communicate data with the state detection unit 102 via the data line. Such configuration is easy to implement, with high communication quality and low cost.

In a specific implement, the above state detection unit 102 may be provided in the active DAS master unit. In one embodiment, as shown in FIG. 3, the system for signal backup of active DAS master unit according to the present disclosure may further include an active DAS master unit 101', in which the state detection unit 102 is arranged on the active DAS master unit 101', each of the radio frequency access ports 106 arranged on the state detection unit 102 is configured as a radio frequency access port 102' of the active DAS master unit 101', and the backup signal input port 107 arranged on the state detection unit 102 is configured as a backup signal input port 103' of the active DAS master unit 101'.

Figure 3:
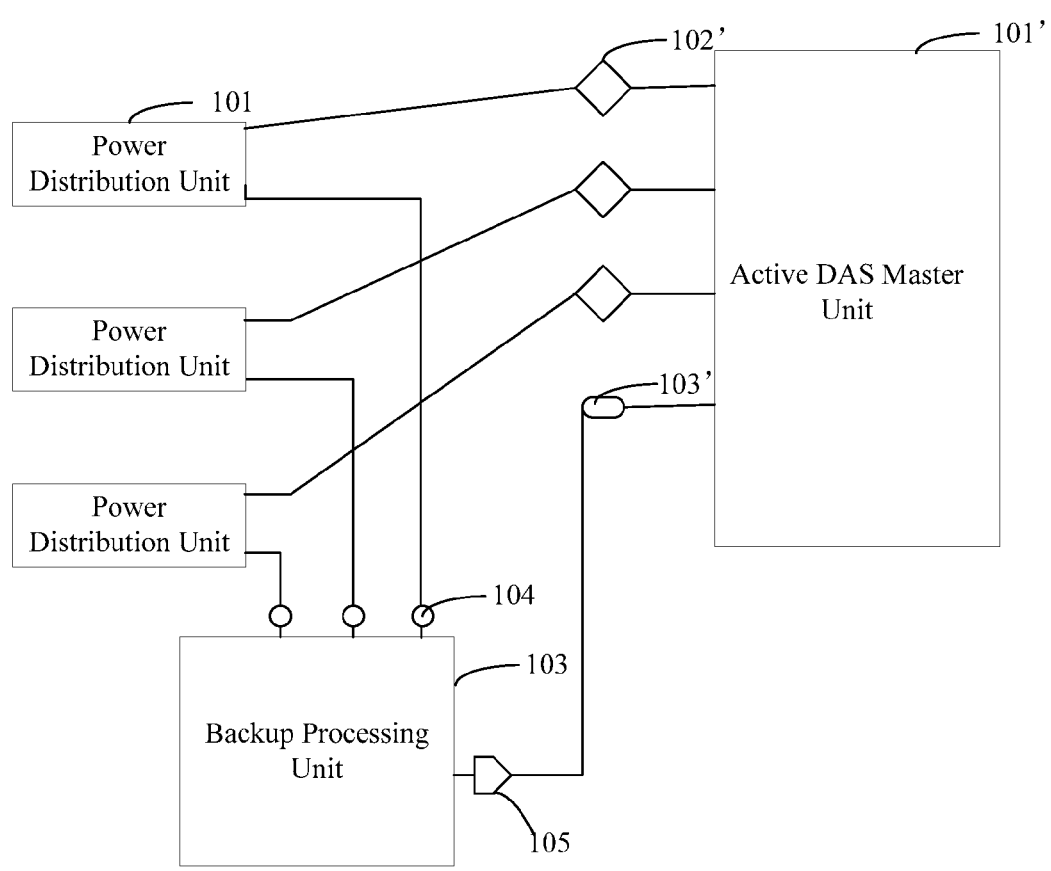
FIG. 3 is a schematic diagram illustrating a system for signal backup of active DAS master unit according to another embodiment of the present disclosure.

In such configuration, as shown in FIG. 3, the system for signal backup of active DAS master unit according to the present disclosure may include an active DAS master unit 101', a backup processing unit 103 and at least two power distribution units 101. The active DAS master unit 101' is configured to implement the functions of the state detection unit 102 in the above embodiments, but is not limited thereto, and can perform other functions.

In one embodiment, the backup process may be performed as below.

The state detection unit 102 is configured to detect the accessing state of each of the radio frequency access ports 106, transmit first state information to the backup processing unit 103 when each of the radio frequency access ports 106 is in the accessing-normal state, and transmit second state information to the backup processing unit 103 when any one of the radio frequency access ports 106 is in the accessing-abnormal state, the second state information including signal source identification information; and the backup processing unit 103 is configured to control each second signal to be in a backup-off state when receiving the first state information, and control the second signal corresponding to the signal source identification information to access the backup signal input port 107 when receiving the second state information.

Figure 4:
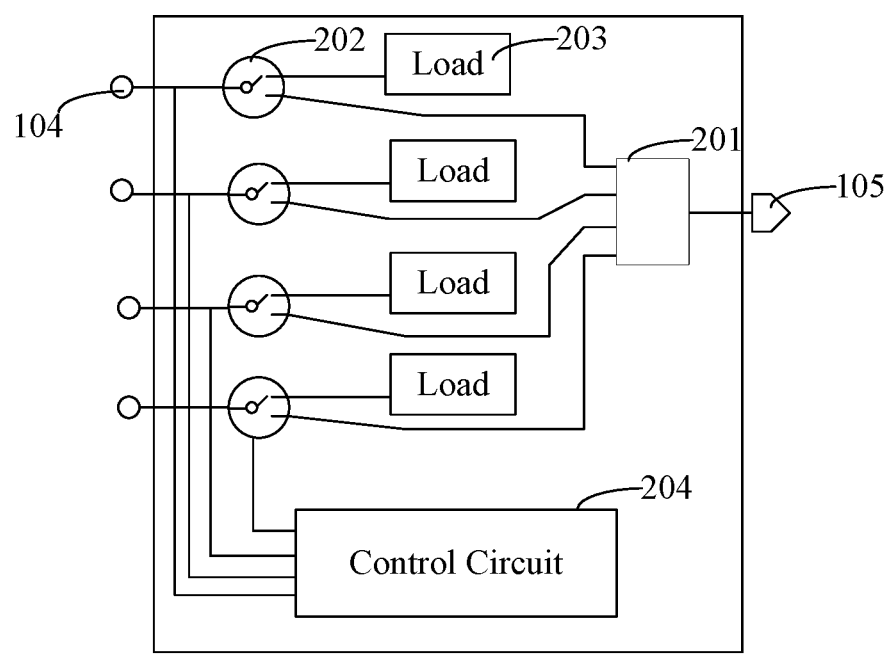
FIG. 4 is a schematic diagram illustrating details of a backup processing unit in FIG. 2 according to one embodiment of the present disclosure.

In one embodiment, as shown in FIG. 4, the backup processing unit 103 may include a combiner 201, a control circuit 204, a plurality of switches 202 with a number corresponding to the number of the backup access ports 104, and a plurality of loads 203 with a number corresponding to the number of the backup access ports;

each of the plurality of switches has a movable terminal coupled to one of the backup access ports 104, and two stationary terminals of which one is coupled to one of the plurality of loads 203 and the other is coupled to one of input ports of the combiner 201;

the combiner 201 has an output port coupled to the backup signal output port 105, or as the backup signal output port 105, that is, the output port of the combiner 201 and the backup signal output port 105 may be operated as independent ports respectively or as whole; and the control circuit 204 is coupled to the plurality of switches 202, and configured to control each of the plurality of switches to switch the movable terminal to couple the load 203 or the combiner 201.

Specifically, the control circuit 204 may control each of the switches 202 to be switched between different states. It can be seen from the coupling relation of the switch 202 to the backup access port 104, the load 203 and the combiner 201, the movable terminal of the switch 202 can be switched from the load 203 to the combiner 201, or from the combiner 201 to the load 203 by controlling the switching of the states of the switch 202. When the movable terminal of the switch 202 is coupled to the load, the corresponding second signal is in the backup-off state, and if the movable terminal of each switch is coupled to the load 203, there is no signal output from the backup signal output port 105 of the backup processing unit 103. When the movable terminal of any one of the switches 202 is coupled to the combiner 201, the corresponding second signal is in the backup-on state, and the second signal is output from the backup signal output port 105 and access the backup signal input port 107 finally.

In addition, in order to improve the utilization of various components or circuits in the backup processing unit 103, the number of the input ports of the combiner 201 is preferably the same as that of the switches 202, and the number of the control circuits 204 preferably matches the number of the switches 202. The number of the control circuits 204 matching the number of the switches 202 means that these numbers are designed so that the control circuits 204 can appropriately control each of the switches 202 respectively. That is, all of the switches 202 can be controlled by one control circuit 204, or there may be a plurality of control circuits 204, and each control circuit is responsible for controlling a part of the switches 202, but the total number of the switches controlled by the control circuits 204 should be the same as the number of switches 202 in the backup processing unit 103.

The system for signal backup of active DAS master unit in the above embodiments can be preferably applied in the backup of a plurality of signal sources with a same frequency band, has a better application prospect.

Figure 5:
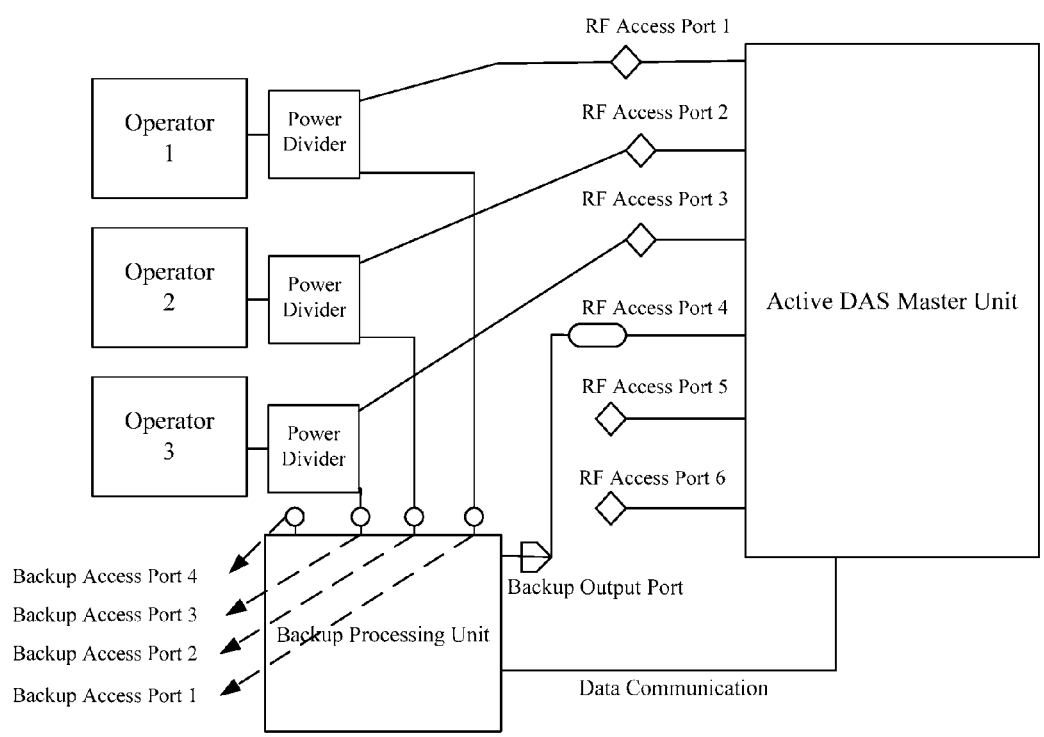
FIG. 5 is a schematic diagram illustrating a system for signal backup of active DAS master unit according to an exemplary embodiment of the present disclosure.

In order to facilitate understanding the present disclosure, the present disclosure will be illuminated in a specific exemplary embodiment below. In the specific exemplary embodiment, the state detection unit 102 is arranged on the active DAS master unit, and three base stations of three operators (including an operator A, an operator B and an operator C) at the frequency of 1,800 MHz access the active DAS master unit as signal sources, but the present disclosure is not limited thereto. See FIG. 5, which is s a schematic diagram illustrating a system for signal backup of active DAS master unit according to the specific exemplary embodiment.

The signal of each of the three signal sources is distributed with power, that is, is divided into two signals. One of the two divided signals of the respective operator is coupled to the RF access port 1, the RF access port 2 or the RF access port 3 of the master unit respectively. The other of the two divided signals of the respective operator is coupled to the backup access port 1, backup access port 2 or the backup access port 3 of the backup processing unit respectively. The backup signal output port of the backup processing unit is coupled to the RF access port 4 (equivalent to the above backup signal input port 107) of the active DAS master unit. The backup processing unit 103 is coupled with the active DAS master unit via a data line.

When each of the RF access port 1, the RF access port 2 or the RF access port 3 of the active DAS master unit is accessed for working, the backup processing unit may acquire the state indication of the active DAS master unit, and control each of the switch 1, the switch 2 and the switch 3 to be coupled to the load. At this time, there is no signal output from the backup signal output port of the backup processing unit. When the active DAS master unit detects that is an abnormality (which may be hardware failure or software failure) in the path corresponding to the RF access port 1, the information may be transmitted to the backup processing unit, the backup processing unit may switch the state of the switch 1 so that the signal of the operator A coupled to the backup access port 1 may pass into the RF access port 4 of the active DAS master unit through the backup processing unit, and the active DAS master unit may continue to work.

Similarly, when each of the RF access port 1, the RF access port 2 or the RF access port 3 of the active DAS master unit is accessed for working, the backup processing unit may acquire the state indication of the active DAS master unit, and control each of the switch 1, the switch 2 and the switch 3 to be coupled to the load. At this time, there is no signal output from the backup signal output port of the backup processing unit. When the active DAS master unit detects that is an abnormality (which may be hardware failure or software failure) in the path corresponding to the RF access port 2, the information may be transmitted to the backup processing unit, the backup processing unit may switch the state of the switch 2 so that the signal of the operator B coupled to the backup access port 2 may pass into the RF access port 4 of the active DAS master unit through the backup processing unit, and the master unit may continue to work.

Similarly, when each of the RF access port 1, the RF access port 2 or the RF access port 3 of the active DAS master unit is accessed for working, the backup processing unit may acquire the state indication of the active DAS master unit, and control each of the switch 1, the switch 2 and the switch 3 to be coupled to the load. At this time, there is no signal output from the backup signal output port of the backup processing unit. When the active DAS master unit detects that is an abnormality (which may be hardware failure or software failure) in the path corresponding to the RF access port 3, the information may be transmitted to the backup processing unit, the backup processing unit may switch the state of the switch 3 so that the signal of the operator C coupled to the backup access port 3 may pass into the RF access port 4 of the active DAS master unit through the backup processing unit, and the master unit may continue to work.

Figure 6:
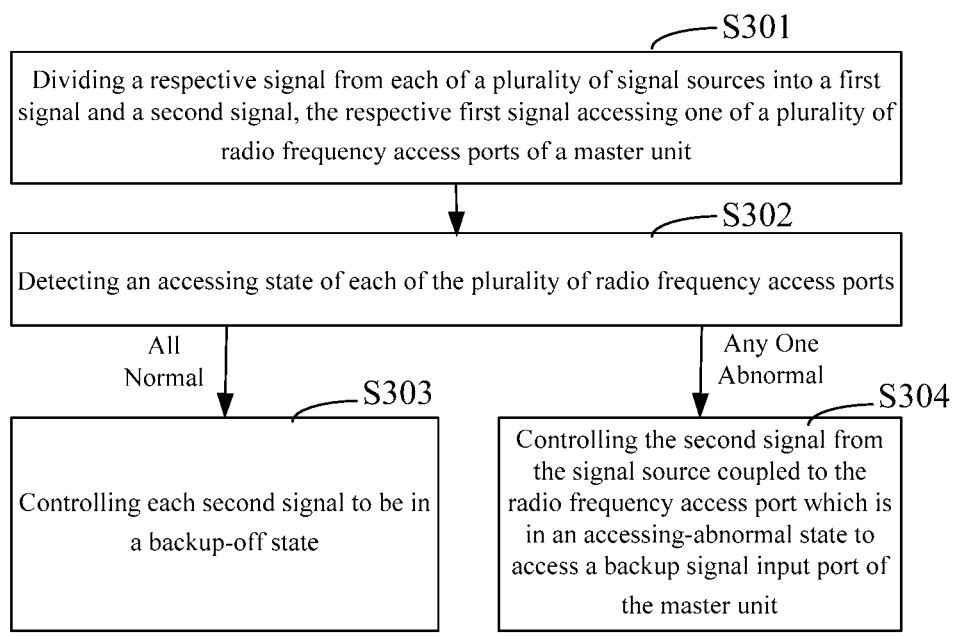
FIG. 6 is a flow diagram illuminating a method for signal backup of active DAS master unit according to one embodiment of the present disclosure.

According to the above system for signal backup of active DAS master unit, the present disclosure further provides a method for signal backup of active DAS master unit. As shown in FIG. 6, it is a flow diagram illuminating a method for signal backup of active DAS master unit according to one embodiment of the present disclosure. The method may include the following steps:

step S301, dividing a respective signal from each of a plurality of signal sources into a first signal and a second signal, the respective first signal accessing one of a plurality of radio frequency access ports of a master unit, proceeding to step S302, wherein each of the plurality of signal sources generally has a same frequency band;

step S302, detecting an accessing state of each of the plurality of radio frequency access ports, proceeding to step S303 when each of the plurality of radio frequency access ports is detected to be in an accessing-normal state, and proceeding to step S304 when any one of the plurality of radio frequency access ports is in the accessing-abnormal state;

step S303, controlling each second signal to be in a backup-off state, that is, without backup of the signal sources; and step S304, controlling the second signal from the signal source corresponding to the radio frequency access port which is in an accessing-abnormal state to access a backup signal input port of the master unit, that is, controlling the second signal from the signal source corresponding to the radio frequency access port which is in an accessing-abnormal state to access the master unit.

According to the above embodiment, a signal from each signal source can be divided into two, one may access one radio frequency access port of the master unit directly, and the other may access the backup signal input port when there is an accessing abnormality in directly accessing the radio frequency access port. In this way, even any one of the plurality of signal sources is abnormal in accessing, it can be backed up by accessing the backup signal input port, to achieve a N+1 backup, so the present invention can reduce the hardware cost while guarantee the reliability to improve the cost performance of the backup system.

The above are embodiments of the disclosure described in detail, and should not be deemed as limitations to the scope of the present disclosure. It should be noted that variations and improvements will become apparent to those skilled in the art to which the present disclosure pertains without departing from its spirit and scope. Therefore, the scope of the present disclosure is defined by the appended claims.

The invention claimed is:

1. A system for signal backup of active DAS master unit, comprising a state detection unit, a backup processing unit and at least two power distribution units, wherein a backup signal output port and a plurality of backup access ports with a number great than or equal to that of the power distribution units are arranged on the backup processing unit, and a backup signal input port and a plurality of radio frequency access ports with a number great than or equal to that of the power distribution units are arranged on the state detection unit;

each of the at least two power distribution units has an input port coupled to one of a plurality of signal sources, and two output ports of which one is coupled to one of the plurality of radio frequency access ports and the other is coupled to one of the plurality of backup access ports, and the backup signal output port is coupled to the backup signal input port;

each of the power distribution units is configured to divide a signal from the coupled signal source into a first signal accessing the coupled radio frequency access port and a second signal accessing the coupled backup access port;

the state detection unit is configured to detect an accessing state of each of the plurality of radio frequency access ports; and the backup processing unit is configured to control each second signal to be in a backup-off state, when each of the plurality of radio frequency access ports is in an accessing-normal state, and control the second signal from the signal source coupled to the radio frequency access port in an accessing-abnormal state to access the backup signal input port, when any one of the plurality of radio frequency access ports is in the accessing-abnormal state.

2. The system for signal backup of active DAS master unit of claim 1, wherein the backup processing unit is coupled to the state detection unit via a data line, and the backup processing unit communicates data with the state detection unit via the data line.

3. The system for signal backup of active DAS master unit of claim 1, wherein the backup processing unit includes a combiner, a control circuit, a plurality of switches with a number corresponding to the number of the plurality of backup access ports, and a plurality of loads with a number corresponding to the number of the plurality of backup access ports;

each of the plurality of switches has a movable terminal coupled to one of the plurality of backup access ports, and two stationary terminals of which one is coupled to one of the plurality of loads and the other is couple to one of input ports of the combiner;

the combiner has an output port coupled to the backup signal output port, or as the backup signal output port; and the control circuit is coupled to the plurality of switches, and configured to control each of the plurality of switches to switch the movable terminal to couple the load or the combiner.

4. The system for signal backup of active DAS master unit of claim 3, wherein the combiner has a plurality of input ports with a number the same as that of the plurality of switches.

5. The system for signal backup of active DAS master unit of claim 3, wherein the number of the control circuits matches that of the plurality of switches.

6. The system for signal backup of active DAS master unit of claim 1, wherein the state detection unit is further configured to detect the accessing state of each of the radio frequency access ports, to transmit first state information to the backup processing unit when each of the plurality of radio frequency access ports is in the accessing-normal state, and transmit second state information to the backup processing unit when any one of the plurality of radio frequency access ports is in the accessing-abnormal state, the second state information including signal source identification information; and the backup processing unit is further configured to control each second signal to be in a backup-off state when receiving the first state information, and control the second signal corresponding to the signal source identification information to access the backup signal input port when receiving the second state information.

7. The system for signal backup of active DAS master unit of claim 1, further comprising an active DAS master unit, wherein the state detection unit is arranged on the active DAS master unit, each of the plurality of radio frequency access ports arranged on the state detection unit is configured as a radio frequency access port of the active DAS master unit, and the backup signal input port arranged on the state detection unit is configured as a backup signal input port of the active DAS master unit.

8. The system for signal backup of active DAS master unit of claim 1, wherein each the plurality of signal sources has a same frequency band.

9. A method for signal backup of active DAS master unit, comprising:

dividing a respective signal from each of a plurality of signal sources into a first signal and a second signal, the respective first signal accessing one of a plurality of radio frequency access ports of a master unit;

detecting an accessing state of each of the plurality of radio frequency access ports; and controlling each second signal to be in a backup-off state, when each of the plurality of radio frequency access ports is detected to be in an accessing-normal state, and controlling the second signal from the signal source coupled to the radio frequency access port which is in an accessing-abnormal state to access a backup signal input port of the master unit, when any one of the plurality of radio frequency access ports is in the accessing-abnormal state.

10. The method for signal backup of active DAS master unit of claim 9, wherein each the plurality of signal sources has a same frequency band.

* * * * *